United States Patent
Nakagawa

(10) Patent No.: US 11,746,891 B2
(45) Date of Patent: Sep. 5, 2023

(54) SHIFT DEVICE

(71) Applicant: KABUSHIKI KAISHA TOKAI-RIKA-DENKI-SEISAKUSHO, Aichi (JP)

(72) Inventor: Daisuke Nakagawa, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 107 days.

(21) Appl. No.: 16/330,591

(22) PCT Filed: Aug. 30, 2017

(86) PCT No.: PCT/JP2017/031252
§ 371 (c)(1),
(2) Date: Mar. 5, 2019

(87) PCT Pub. No.: WO2018/047701
PCT Pub. Date: Mar. 15, 2018

(65) Prior Publication Data
US 2020/0149626 A1 May 14, 2020

(30) Foreign Application Priority Data

Sep. 12, 2016 (JP) ................................. 2016-178006

(51) Int. Cl.
F16H 59/10 (2006.01)
G05G 1/04 (2006.01)
(Continued)

(52) U.S. Cl.
CPC .............. *F16H 59/10* (2013.01); *G05G 1/04* (2013.01); *B60K 20/04* (2013.01); *F16H 61/24* (2013.01);
(Continued)

(58) Field of Classification Search
CPC .. F16H 59/10; F16H 61/24; F16H 2059/0221; F16H 61/16; F16H 61/32;
(Continued)

(56) References Cited

U.S. PATENT DOCUMENTS 5,662,001 A * 9/1997 Smale ...................... F16H 59/04
74/483 R
5,829,309 A * 11/1998 Wagner ................... F16H 59/10
74/473.22

(Continued)

FOREIGN PATENT DOCUMENTS

| JP | 2008-023078 A | 2/2008 |
|---|---|---|
| JP | 2011-110990 A | 6/2011 |
| JP | 2013-086550 A | 5/2013 |

OTHER PUBLICATIONS

International Search Report and Written Opinion issued in corresponding International Application No. PCT/JP2017/031252 dated Oct. 24, 2017.

*Primary Examiner* — Gregory Robert Weber
(74) *Attorney, Agent, or Firm* — Thomas W. Cole; Calderon Safran & Cole P.C.

(57) ABSTRACT

In a shift lever device, a lock bar is disposed in a restricting position to restrict changing of a shift position of a lever. A motor is driven to rotate a cam in order to move the lock bar to a non-restricting position, thereby permitting changing of the shift position of the lever. The lock bar is moved as the rotation position of the cam is changed. This enables the precision required of the rotation position of the cam in order to dispose the lock bar in the restricting position and the non-restricting position to be lowered, thereby enabling appropriate switching between restriction and permission of changes in shift position of the lever to be performed by driving of the motor.

3 Claims, 5 Drawing Sheets

(51) Int. Cl.
*B60K 20/04* (2006.01)
*F16H 61/24* (2006.01)
*F16H 59/02* (2006.01)

(52) U.S. Cl.
CPC ............... *F16H 2059/0221* (2013.01); *F16H 2061/243* (2013.01)

(58) Field of Classification Search
CPC ..... F16H 61/22; F16H 2061/243; G05G 1/04; B60K 20/04
USPC .......................................... 74/473.21, 473.23
See application file for complete search history.

(56) References Cited

U.S. PATENT DOCUMENTS

| | | | | |
|---|---|---|---|---|
| 7,832,302 B2* | 11/2010 | Wang | ...................... | F16H 61/22 74/473.23 |
| 8,196,491 B2* | 6/2012 | Wilson | ................ | F16H 59/0204 74/473.23 |
| 8,397,894 B2* | 3/2013 | Jeong | ...................... | F16H 61/22 192/220.3 |
| 8,544,358 B1* | 10/2013 | Giefer | ...................... | F16H 61/22 74/473.25 |
| 8,978,504 B2* | 3/2015 | Morimura | ............... | F16H 61/22 74/473.23 |
| 9,291,259 B2* | 3/2016 | Watanabe | ............... | F16H 59/08 |
| 9,620,309 B2* | 4/2017 | Hoskins | .................. | F16H 61/22 |
| 9,845,868 B2* | 12/2017 | Lee | ........................ | F16H 59/08 |
| 10,344,849 B2* | 7/2019 | Cimmino | ................ | F16H 59/10 |
| 10,371,251 B2* | 8/2019 | Meyer | ................. | F16H 59/0204 |
| 10,458,536 B2* | 10/2019 | Insanic | ................... | F16H 59/10 |
| 2004/0229726 A1 | 11/2004 | Wilde | | |
| 2014/0352476 A1* | 12/2014 | Kim | ........................ | F16H 59/02 74/473.21 |
| 2015/0027861 A1* | 1/2015 | Hoskins | .................. | F16H 59/08 200/43.11 |
| 2016/0123460 A1* | 5/2016 | Tsukazaki | ........... | F16H 59/0204 74/473.23 |
| 2018/0172140 A1* | 6/2018 | Liubakka | ................ | F16H 59/10 |
| 2019/0316673 A1* | 10/2019 | Tsukazaki | ........... | F16H 59/0213 |

* cited by examiner

SHIFT DEVICE

TECHNICAL FIELD

The present invention relates to a shift device in which a shift body is moved to change a shift position of a shift body.

BACKGROUND ART

In a shift lever device disclosed in Japanese Patent Application Laid-Open (JP-A) No. 2013-86550, a restricting link is disposed at a restricting position to restrict changing of a shift position of a shift lever. A button is operated to drive a solenoid, such that the restricting link is pivoted from the restricting position to a non-restricting position, and changing of the shift position of the shift lever is permitted.

Note that in this shift lever device, it would be preferable to be able to switch appropriately between restriction and permission of changes in shift position of the shift lever.

SUMMARY OF INVENTION

Technical Problem

In consideration of the above circumstances, an object of the present invention is to obtain a shift device capable of appropriate switching between restriction and permission of changes in shift position of a shift body.

Solution to Problem

A shift device of a first aspect of the present invention includes a shift body, a restriction section, an operation section, and a rotation section. The shift body is moved to change a shift position. The restriction section is disposed in a restricting position to restrict changing of a shift position of the shift body, and is moved from the restricting position to a non-restricting position to permit changing of a shift position of the shift body. The operation section is configured to be operated. The rotation section has a rotation position that is changed by operation of the operation section so that the restriction section is moved from the restricting position to the non-restricting position, the restriction section being moved as the rotation position is changed.

A shift device of a second aspect of the present invention includes a shift body, a restriction section, and an operation section. The shift body is moved to change a shift position. The restriction section is disposed in a restricting position to restrict changing of a shift position of the shift body, and is moved from the restricting position to a non-restricting position to permit changing of a shift position of the shift body. The restricting position is a constant position. The operation section is operated so that the restriction section is moved from the restricting position to the non-restricting position.

A shift device of a third aspect of the present invention includes a shift body, a restriction section, an operation section, and a motor. The shift body is moved to change a shift position. The restriction section is disposed in a restricting position to restrict changing of a shift position of the shift body, and is moved from the restricting position to a non-restricting position to permit changing of a shift position of the shift body. The operation section is configured to be operated. The motor is driven by operation of the operation section so as to move the restriction section from the restricting position to the non-restricting position.

Advantageous Effects of Invention

In the shift device of the first aspect of the present invention, the shift body is moved to change the shift position of the shift body. Moreover, the restriction section is disposed at the restricting position to restrict changing of the shift position of the shift body. The operation section is operated to change the rotation position of the rotation section and thereby the restriction section is moved from the restricting position to the non-restricting position, thus permitting changing of the shift position of the shift body.

Note that the restriction section is moved as the rotation position of the rotation section is changed. This enables the precision required of the rotation position of the rotation section in order to dispose the restriction section in at least one of the restricting position or the non-restricting position to be lowered, thereby enabling appropriate switching between restriction and permission of changes in shift position of the shift body.

In the shift device of the second aspect of the present invention, the shift body is moved to change the shift position of the shift body. Moreover, the restriction section is disposed at the restricting position to restrict changing of the shift position of the shift body. The operation section is operated so that the restriction section is moved from the restricting position to the non-restricting position and thereby permit changing of the shift position of the shift body.

Note that the restricting position of the restriction section is a constant position. This enables the movement stroke of the restriction section between the restricting position and the non-restricting position to be reduced, enabling appropriate switching between restriction and permission of changes in shift position of the shift body.

In the shift device of the third aspect of the present invention, the shift body is moved to change the shift position of the shift body. Moreover, the restriction section is disposed at the restricting position to restrict changing of the shift position of the shift body. The operation section is operated so that the restriction section is moved from the restricting position to the non-restricting position and thereby permit changing of the shift position of the shift body.

Note that when the operation section is operated, the motor is driven to move the restriction section from the restricting position to the non-restricting position. This enables the restriction section to be moved from the restricting position to the non-restricting position even in cases in which there is large resistance to the movement of the restriction section, thereby enabling appropriate switching between restriction and permission of changes in shift position of the shift body.

DESCRIPTION OF EMBODIMENTS

Figure 1:
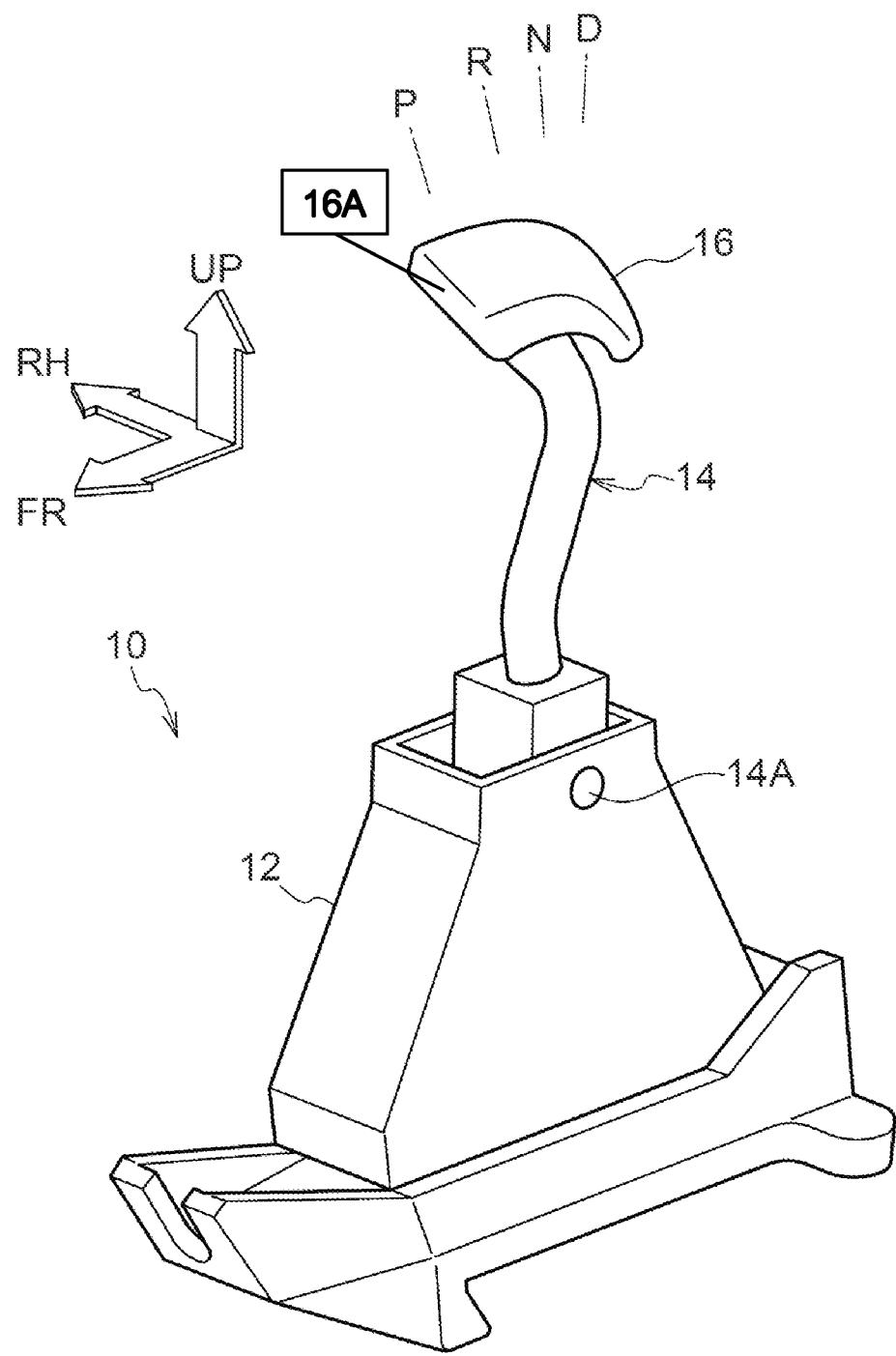
FIG. 1 is a perspective view illustrating a shift lever device according to an exemplary embodiment of the present invention, as viewed obliquely from the front left.
Figure 2:
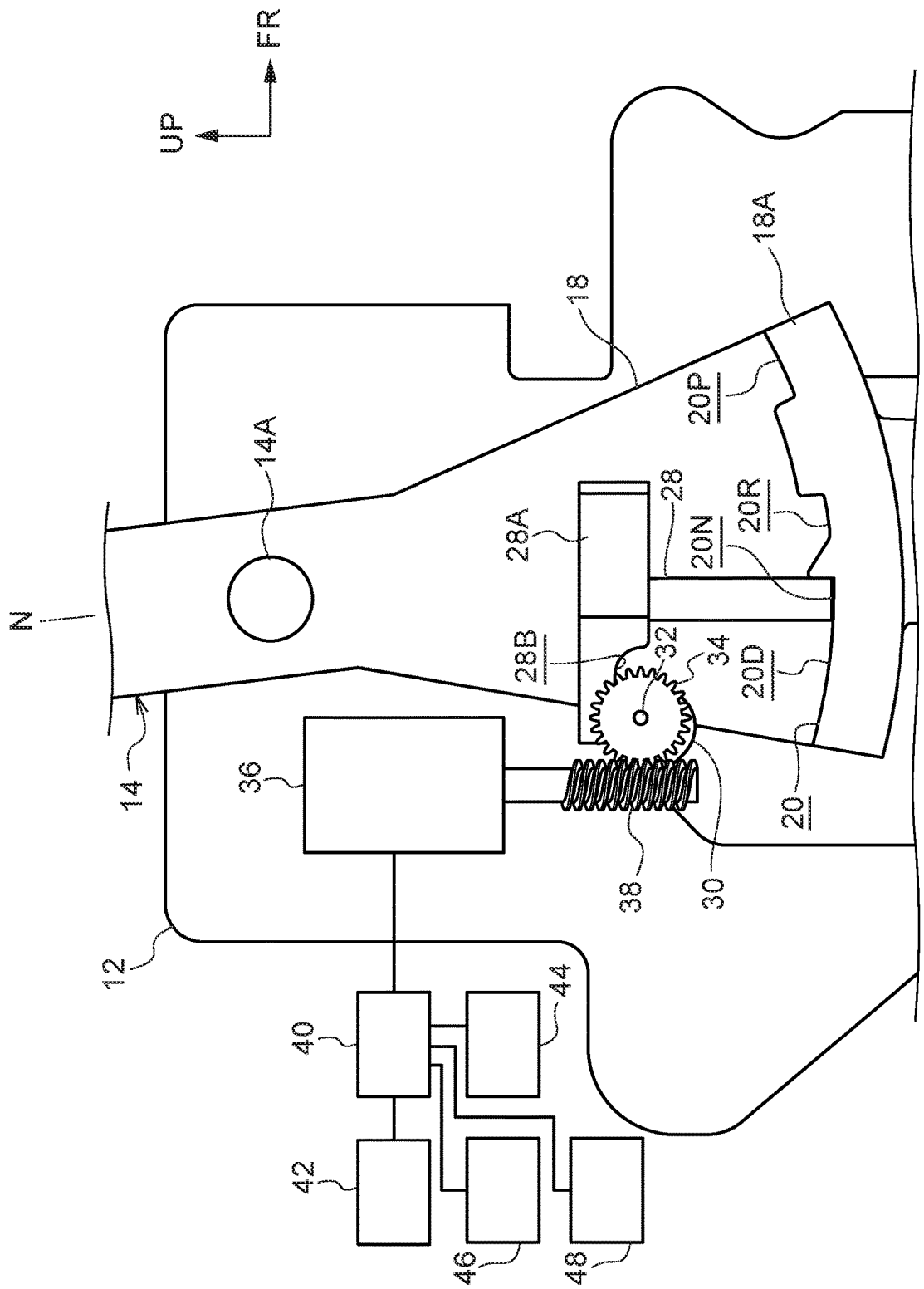
FIG. 2 is a side view illustrating relevant portions of the shift lever device according to the exemplary embodiment of the present invention, as viewed from the right.

FIG. 1 illustrates a shift lever device 10, serving as a shift device according to an exemplary embodiment of the present invention, in a perspective view as viewed obliquely from the front left. FIG. 2 illustrates relevant portions of the shift lever device 10 in a side view as viewed from the right. Note that in the drawings, the arrow FR indicates the front of the shift lever device 10, the arrow RH indicates the right of the shift lever device 10, and the arrow UP indicates the upper side of the shift lever device 10.

The shift lever device 10 according to the present exemplary embodiment is what is called a straight shift device. The shift lever device 10 is floor-mounted, and is installed to a floor section of a vehicle cabin (vehicle body side) at the vehicle width direction inside of a driver's seat (not illustrated in the drawings) of a vehicle (automobile). The front, right, and upper side of the shift lever device 10 are respectively oriented toward the front, right, and upper side of the vehicle.

As illustrated in FIG. 1 and FIG. 2, the shift lever device 10 is provided with a substantially cuboidal box shaped plate 12 (housing) made of resin and serving as a support body. The plate 12 is fixed to the floor section of the vehicle cabin in order to install the shift lever device 10 to the floor section of the vehicle cabin.

A substantially elongated rod shaped lever 14, serving as a shift body, is disposed inside the plate 12. An up-down direction intermediate portion of the lever 14 is provided with a circular column shaped support shaft 14A, and the support shaft 14A of the lever 14 is supported by an upper portion of the plate 12 such that the lever 14 is capable of pivoting (moving) in a front-rear direction within a predetermined range. The lever 14 extends from the plate 12 toward the upper side. An upper side portion of the lever 14 is curved along its length direction.

A knob 16, serving as a grip section, is integrally provided to an upper end portion (leading end portion) of the lever 14. The lever 14 is capable of being pivot-operated in a state in which the knob 16 is gripped by an occupant (particularly the driver) of the vehicle. Accordingly, the lever 14 is capable of pivoting to a P position (a parking position), an R position (a reverse position), an N position (a neutral position), and a D position (a drive position), each serving as a shift position, in sequence from the front side to the rear side.

The knob 16 is provided with a button 16A (a switch, not illustrated in the drawings) serving as an operation section. The button 16A is capable of being operated (push-operated) by an occupant.

A shift detection mechanism 44 (see FIG. 2) is provided inside the plate 12. When the lever 14 has been disposed at the P position, the shift detection mechanism 44 detects that the lever 14 is disposed at the P position. An operation detection mechanism 46 (see FIG. 2) is electrically connected to the button 16A on the knob 16. When the button 16A has been operated, the operation detection mechanism 46 detects that the button 16A has been operated.

A pivot plate 18 with a substantially fan-shaped plate shape is provided to a lower section of the lever 14. A lower face of the pivot plate 18 is curved so as to follow a pivot-circumferential direction of the lever 14. A projection 18A is integrally provided to a lower end portion of the pivot plate 18. The projection 18A projects toward the right and extends along the pivot-circumferential direction of the lever 14.

A detent groove 20 having a predetermined shape and serving as a stopper section is formed in an upper face of the projection 18A. The detent groove 20 is disposed spanning the entire projection 18A in the extension direction of the projection 18A. A P groove 20P is formed in a front end portion of the detent groove 20. A rear face of the P groove 20P is disposed substantially perpendicular to the pivot-circumferential direction of the lever 14. An R groove 20R is formed in a front-rear direction intermediate portion of the detent groove 20. A front face of the R groove 20R is disposed substantially perpendicular to the pivot-circumferential direction of the lever 14, and a rear face of the R groove 20R is inclined in a direction toward the upper side on progression toward the rear side. An N groove 20N is formed in the detent groove 20 at the rear side of the R groove 20R. A front face of the N groove 20N is disposed substantially perpendicular to the pivot-circumferential direction of the lever 14. A D groove 20D is formed in the detent groove 20 at the rear side of the N groove 20N. The D groove 20D is in communication with the rear side of the N groove 20N. Upper faces of the detent groove 20 (an upper face between the P groove 20P and the R groove 20R and an upper face between the R groove 20R and the N groove 20N) are configured so as to lie in a single curved plane along the pivot-circumferential direction of the lever 14, and lower faces of the detent groove 20 (lower faces of the P groove 20P, the R groove 20R, the N groove 20N, and the D groove 20D) are configured so as to lie in a single curved plane along the pivot-circumferential direction of the lever 14.

Figure 3:
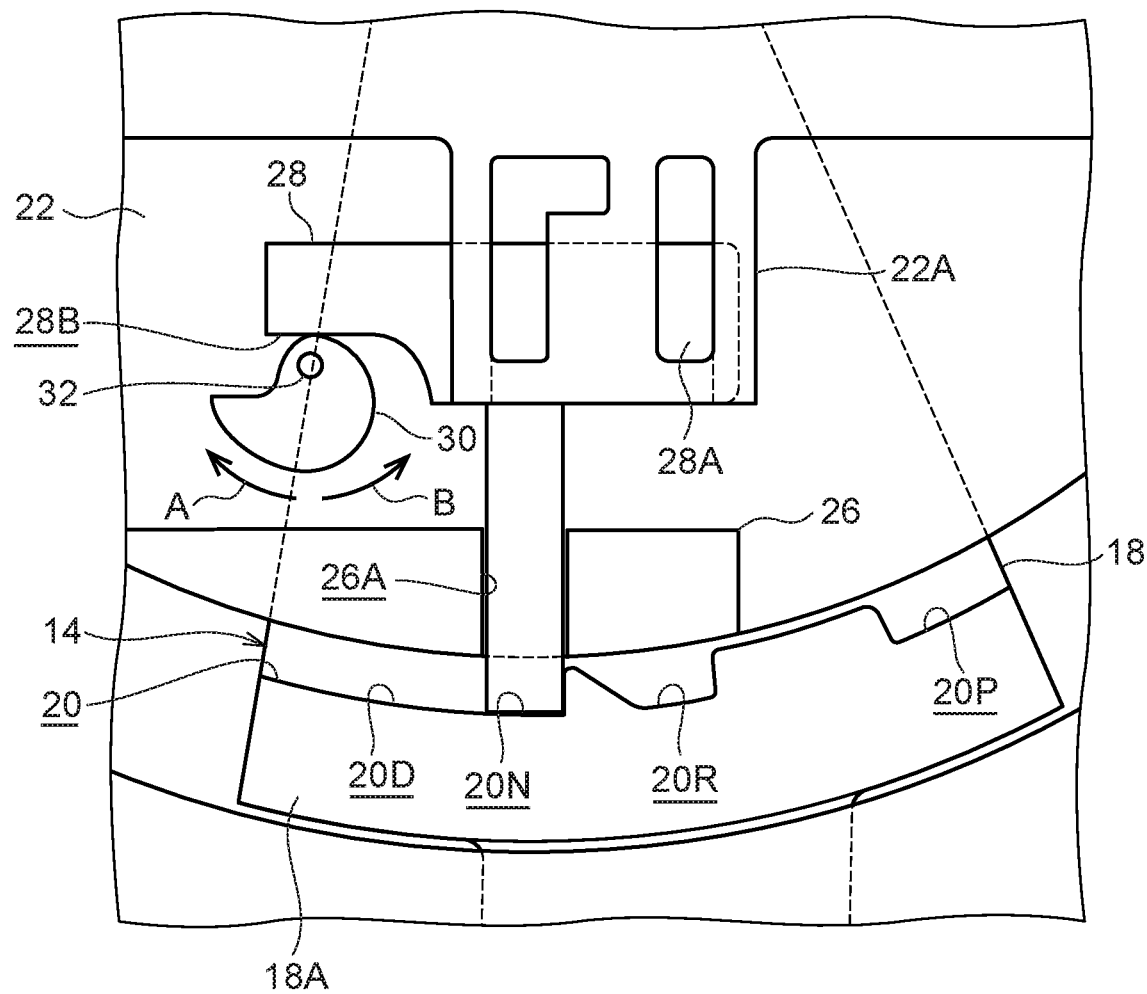
FIG. 3 is a side view illustrating the shift lever device according to the exemplary embodiment of the present invention when a pivot operation of a lever from an N position toward the front side is restricted, as viewed from the right.
Figure 5:
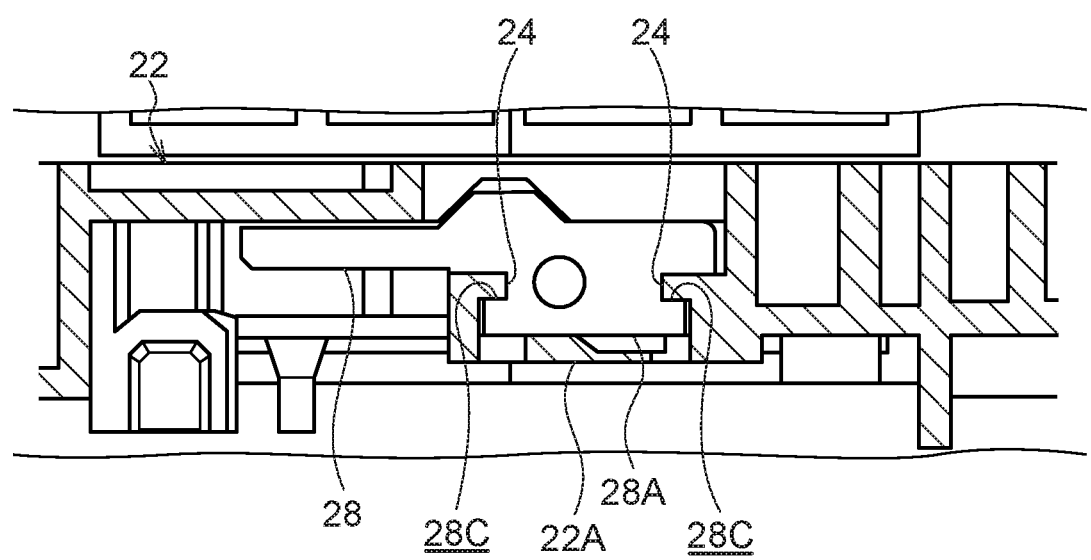
FIG. 5 is a cross-section illustrating a support plate and a lock bar of the shift lever device according to the exemplary embodiment of the present invention, as viewed from above.

As illustrated in FIG. 3, a substantially flat-plate shaped support plate 22, serving as a support member, is fixed inside the plate 12. The support plate 22 is disposed perpendicular to the left-right direction. The support plate 22 is disposed at the upper side of the projection 18A of the lever 14, and the projection 18A projects toward the right of the support plate 22. A substantially cuboidal box shaped support frame 22A (see FIG. 5) is integrally provided to the support plate 22. A left wall of the support frame 22A is formed by the support plate 22. The support frame 22A projects toward the right, and is open at the entire lower face and a left side portion of a rear face of the support frame 22A. Guide portions 24, each with a rectangular shaped cross-section profile, are integrally provided to a left-right direction center of the front wall of the support frame 22A, and to a left end of a rear wall of the support frame 22A. The pair of guide portions 24 each extend in the up-down direction and face each other in the front-rear direction.

A restriction protrusion 26 is integrally provided to a lower end portion of the support plate 22. The restriction protrusion 26 projects toward the right. A restriction groove 26A with a rectangular shaped cross-section profile is formed in the restriction protrusion 26. The restriction groove 26A passes through the restriction protrusion 26 in the up-down direction and is open toward the right.

A substantially T-shaped plate shaped lock bar 28, serving as a restriction section, is provided on the right of the support plate 22. A substantially cuboidal block shaped protrusion 28A (see FIG. 5) is integrally provided to a front side portion of an upper portion of the lock bar 28. The protrusion 28A projects toward the right. The front side portion of the upper portion of the lock bar 28 (including the protrusion 28A) is inserted into the support frame 22A of the support plate 22. Guide grooves 28C, each with a rectangular shaped cross-section profile, are formed in a front face and a rear face of the protrusion 28A. The pair of guide grooves 28C each extend in the up-down direction so as to pass through the protrusion 28A, and oppose each other in the front-rear direction across the protrusion 28A. The guide portions 24 of the support frame 22A are fitted into the guide grooves 28C. Front-rear direction and left-right direction movement of the lock bar 28 (the protrusion 28A) is thereby restricted, and the guide grooves 28C move in the up-down direction guided by the guide portions 24, such that the lock bar 28 moves in the up-down direction. A lower portion of the lock bar 28 is inserted into the restriction groove 26A in the restriction protrusion 26 of the support plate 22 so as to be capable of moving in the up-down direction. The lower portion of the lock bar 28 is fitted into the restriction groove 26A in the front-rear direction so as to be restricted from moving in the front-rear direction. A recess 28B with a substantially rectangular shaped cross-section profile is formed in a rear side portion of an upper portion of the lock bar 28. The recess 28B is open toward both left and right direction sides, the lower side, and the rear side.

Figure 4:
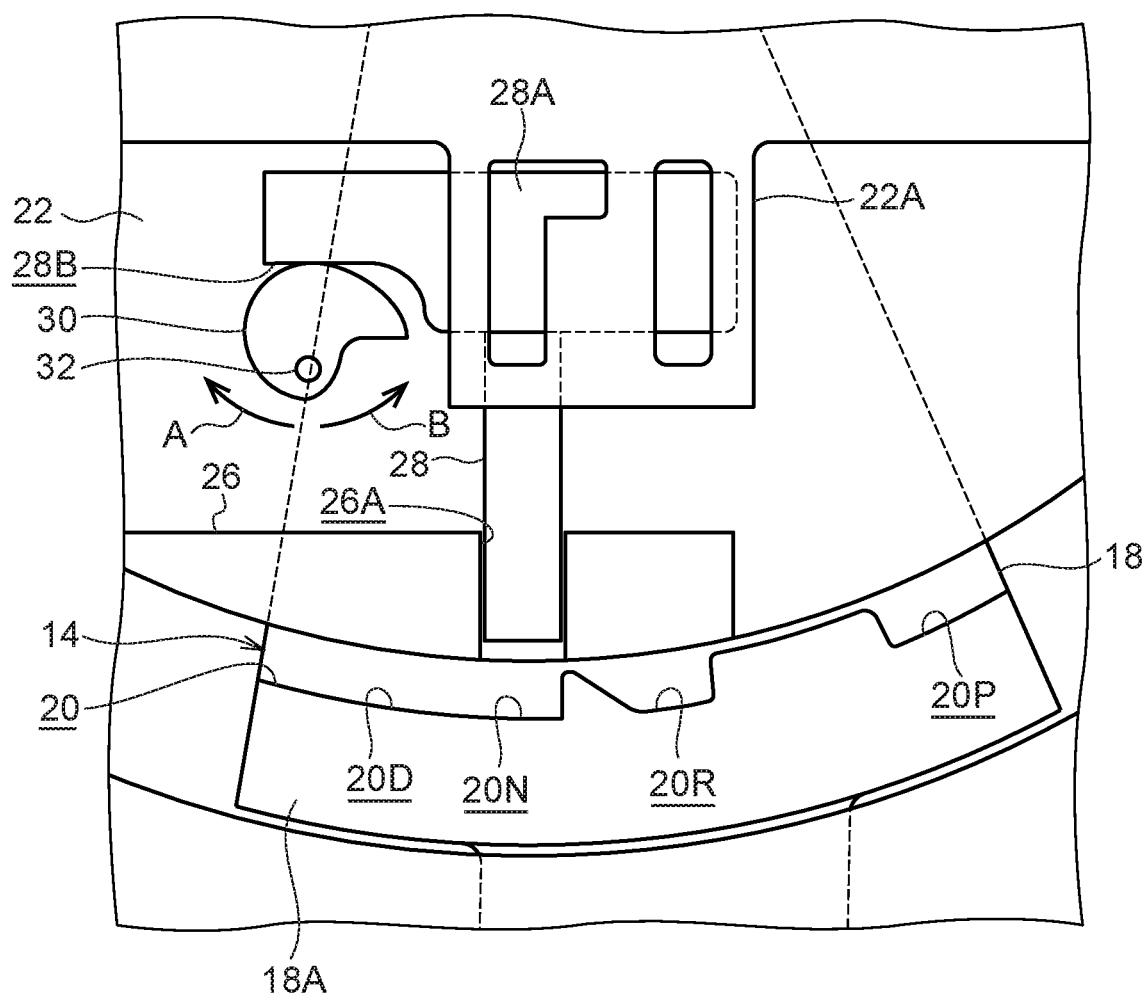
FIG. 4 is a side view illustrating the shift lever device according to the exemplary embodiment of the present invention when the pivot operation of the lever from the N position toward the front side is permitted, as viewed from the right.

A biasing means (not illustrated in the drawings) spans between the support plate 22 (or the support frame 22A) and the lock bar 28. The biasing means biases the lock bar 28 toward the lower side. Thus, when the lever 14 is disposed in the P position, the R position, the N position, or the D position, the lock bar 28 is disposed at a restricting position at the lower side due to biasing force from the biasing means, and a lower end portion of the lock bar 28 is inserted into the corresponding P groove 20P, R groove 20R, N groove 20N, or D groove 20D of the detent groove 20 of the lever 14. The lock bar 28 is capable of moving to a non-restricting position at the upper side against the biasing force of the biasing means. When the lock bar 28 is disposed at the non-restricting position, the lower end portion of the lock bar 28 is disposed at the upper side of the detent groove 20 (see FIG. 4).

A restriction detection mechanism 48 (see FIG. 2) is provided inside the plate 12. The restriction detection mechanism 48 detects an up-down direction position of the lock bar 28.

A substantially flat-plate shaped cam 30, serving as a rotation section, is disposed at the lower side of an upper face of the recess 28B in the lock bar 28. A rotation shaft 32 penetrates through the cam 30 so as to be capable of rotating as a unit with the cam 30. The rotation shaft 32 spans between the support plate 22 and a right wall of the plate 12, and is disposed parallel to the left-right direction. The cam 30 is capable of rotating in a restricting direction A and a permitting direction B in FIG. 3 about the rotation shaft 32. A rotation-radial dimension of the cam 30 is set to gradually increase on progression along the restricting direction A, and the cam 30 is disposed at a rotation position on the restricting direction A side.

As illustrated in FIG. 2, on the right of the cam 30, the rotation shaft 32 coaxially penetrates a gear 34 (worm wheel), and the gear 34 is capable of rotating as a unit with the rotation shaft 32.

A motor 36, serving as a drive mechanism, is disposed inside the plate 12 so as to be located at the upper rear side of the gear 34. The motor 36 is fixed to the right wall of the plate 12. An output shaft of the motor 36 extends downward, and a worm 38 is fixed coaxially to the output shaft of the motor 36. The gear 34 meshes with the worm 38, and the worm 38 rotates as a unit with the output shaft of the motor 36 when the motor 36 is driven. Accordingly, the gear 34 is rotated at a reduced speed, and the rotation shaft 32 and the cam 30 rotate as a unit with the gear 34.

The motor 36 is electrically connected to a control device 40, and the motor 36 is driven in one direction or another direction under the control of the control device 40. A vehicle brake 42 is electrically connected to the control device 40, and the occupant engages the brake 42 to brake the vehicle. The shift detection mechanism 44, the operation detection mechanism 46, the restriction detection mechanism 48, and a notification mechanism (not illustrated in the drawings) are also electrically connected to the control device 40.

Next, explanation follows regarding operation of the present exemplary embodiment.

In the shift lever device 10 configured as described above, when the lever 14 is disposed in the P position, the R position, the N position, or the D position, the lock bar 28 is disposed in the restricting position due to the biasing force of the biasing means, and the lower end portion of the lock bar 28 is inserted into the corresponding P groove 20P, R groove 20R, N groove 20N, or D groove 20D of the detent groove 20 of the lever 14 (the projection 18A of the pivot plate 18).

When the lever 14 is disposed at the P position (when the shift detection mechanism 44 detects that the lever 14 is disposed at the P position), in a state in which the brake 42 is engaged but the button 16A on the knob 16 has not been operated (the operation detection mechanism 46 does not detect operation of the button 16A), the lower end portion of the lock bar 28 is maintained in an inserted state in the P groove 20P. Thus, when the lever 14 is pivot-operated toward the rear side from the P position and the pivot plate 18 is pivoted toward the front side, the lower end portion of the lock bar 28 abuts the rear face of the P groove 20P and pivoting of the pivot plate 18 toward the front side is stopped by the lock bar 28. This restricts (locks) the lever 14 against being pivot-operated from the P position toward the rear side.

When the lever 14 is disposed at the P position (when the shift detection mechanism 44 detects that the lever 14 is disposed at the P position), in a state in which the brake 42 is engaged and the button 16A on the knob 16 has been operated (the operation detection mechanism 46 has detected operation of the button 16A), the motor 36 is driven in the one direction under the control of the control device 40. The output shaft of the motor 36, the worm 38, the gear 34, and the rotation shaft 32 are thereby rotated, such that the cam 30 is rotated in the permitting direction B, the lock bar 28 is moved to the non-restricting position against the biasing force of the biasing means, and the lower end portion of the lock bar 28 is disposed at the upper side of the P groove 20P. Thus, when the lever 14 is pivot-operated from the P position toward the rear side and the pivot plate 18 is pivoted toward the front side, the rear face of the P groove 20P does not abut the lower end portion of the lock bar 28 and pivoting of the pivot plate 18 toward the front side is not stopped by the lock bar 28. Pivot-operation of the lever 14 from the P position toward the rear side is thereby permitted.

When operation of the button 16A on the knob 16 has been released (when a state in which the operation detection mechanism 46 has detected operation of the button 16A transitions to a state in which the operation detection mechanism 46 does not detect operation of the button 16A), the motor 36 is driven in the other direction under the control of the control device 40. The output shaft of the motor 36, the worm 38, the gear 34, and the rotation shaft 32 are thereby rotated, such that the cam 30 is rotated in the restricting direction A and the lock bar 28 is moved toward the lower side due to the biasing force of the biasing means. Thus, when the lever 14 is disposed in the P position, the R position, the N position, or the D position, the lock bar 28 is disposed at the restricting position, and the lower end portion of the lock bar 28 is inserted into the corresponding P groove 20P, R groove 20R, N groove 20N, or D groove 20D.

When the lever 14 is disposed at the R position (when the shift detection mechanism 44 does not detect that the lever 14 is disposed at the P position) and the button 16A on the knob 16 is not operated (the operation detection mechanism 46 does not detect operation of the button 16A), an inserted state of the lower end portion of the lock bar 28 into the R groove 20R is maintained. Thus, when the lever 14 is pivot-operated from the R position toward the front side and the pivot plate 18 is pivoted toward the rear side, the lower end portion of the lock bar 28 abuts the front face of the R groove 20R and pivoting of the pivot plate 18 toward the rear side is stopped by the lock bar 28, thereby restricting pivot-operation of the lever 14 from the R position toward the front side.

However, when the lever 14 is disposed at the R position (when the shift detection mechanism 44 does not detect that the lever 14 is disposed at the P position) and the button 16A on the knob 16 is operated (the operation detection mechanism 46 has detected operation of the button 16A), the motor 36 is driven in the one direction under the control of the control device 40. The output shaft of the motor 36, the worm 38, the gear 34, and the rotation shaft 32 are thereby rotated, such that the cam 30 is rotated in the permitting direction A, the lock bar 28 is moved to the non-restricting position against the biasing force of the biasing means, and the lower end portion of the lock bar 28 is disposed at the upper side of the R groove 20R. Thus, when the lever 14 is pivot-operated from the R position toward the front side and the pivot plate 18 is pivoted toward the rear side, the front face of the R groove 20R does not abut the lower end portion of the lock bar 28 and pivoting of the pivot plate 18 toward the rear side is not stopped by the lock bar 28. Pivot-operation of the lever 14 from the R position toward the front side is thereby permitted.

Further, when the lever 14 is pivot-operated from the R position toward the rear side and the pivot plate 18 is pivoted toward the front side, the lock bar 28 is moved by the rear face of the R groove 20R toward the upper side against the biasing force of the biasing means, after which the N groove 20N reaches the lock bar 28. The lock bar 28 accordingly moves toward the lower side due to the biasing force of the biasing means, and the lower end portion of the lock bar 28 is inserted into the N groove 20N.

When the lever 14 is disposed at the N position (when the shift detection mechanism 44 does not detect that the lever 14 is disposed at the P position) and the button 16A on the knob 16 is not operated (the operation detection mechanism 46 does not detect operation of the button 16A), the inserted state of the lower end portion of the lock bar 28 into the N groove 20N is maintained. Thus, when the lever 14 is pivot-operated from the N position toward the front side and the pivot plate 18 is pivoted toward the rear side, the lower end portion of the lock bar 28 abuts the front face of the N groove 20N, and pivoting of the pivot plate 18 toward the rear side is stopped by the lock bar 28, thereby restricting the pivot-operation of the lever 14 from the N position toward the front side.

However, when the lever 14 is disposed at the N position (when the shift detection mechanism 44 does not detect that the lever 14 is disposed at the P position) and the button 16A on the knob 16 has been operated (the operation detection mechanism 46 has detected operation of the button 16A), the motor 36 is driven in the one direction under the control of the control device 40. The output shaft of the motor 36, the worm 38, the gear 34, and the rotation shaft 32 are thereby rotated, such that the cam 30 is rotated in the permitting direction B, the lock bar 28 is disposed in the non-restricting position against the biasing force of the biasing means, and the lower end portion of the lock bar 28 is disposed at the upper side of the N groove 20N. Thus, when the lever 14 is pivot-operated from the N position toward the front side and the pivot plate 18 is pivoted toward the rear side, the lower end portion of the lock bar 28 does not abut the front face of the N groove 20N and pivoting of the pivot plate 18 toward the rear side is not stopped by the lock bar 28. The lever 14 is thereby permitted to be pivot-operated from the N position toward the front side.

Further, when the lever 14 is pivot-operated from the N position toward the rear side and the pivot plate 18 is pivoted toward the front side, the portion of the detent groove 20 spanning from the N groove 20N to the D groove 20D passes by the lower end portion of the lock bar 28 in a state in which the lock bar 28 does not move in the up-down direction. The lever 14 is accordingly permitted to be pivot-operated from the N position toward the rear side.

Further, when the lever 14 is pivot-operated from the D position toward the front side and the pivot plate 18 is pivoted toward the rear side, the portion of the detent groove 20 spanning from the D groove 20D to the N groove 20N passes by the lower end portion of the lock bar 28 in a state in which the lock bar 28 does not move in the up-down direction. The lever 14 is accordingly permitted to be pivot-operated from the D position toward the front side.

Note that the rotation-radial dimension of the cam 30 is set to gradually increase on progression along the restricting direction A, and that the lock bar 28 is moved in the up-down direction as the rotation position of the cam 30 is changed. This enables the amount by which the lock bar 28 moves in the up-down direction to be reduced relative to the amount by which the rotation position of the cam 30 changes when driven by the motor 36. This enables the precision required of the rotation position of the cam 30 in order to dispose the lock bar 28 in the restricting position or the non-restricting position to be lowered, thereby enabling the precision required of the rotation position of the output shaft of the motor 36 in order to dispose the lock bar 28 in the restricting position or the non-restricting position to be lowered. This enables appropriate switching between restriction and permission of changes in shift position of the lever 14 to be performed by driving of the motor 36.

The lock bar 28 is moved in the up-down direction by rotation of the cam 30. This enables the number of components required to move the lock bar 28 in the up-down direction to be reduced, enabling costs to be reduced and also enabling a reduction in size.

The lower faces of the detent groove 20 (the lower faces of the P groove 20P, the R groove 20R, the N groove 20N, and the D groove 20D) are configured so as to lie in a single curved plane along the pivot-circumferential direction of the lever 14. Thus, the restricting position of the lock bar 28, this being the up-down direction position of the lock bar 28 with respect to the support plate 22 when the lower end portion of the lock bar 28 abuts a lower face of the detent groove 20, is a constant position. This enables the movement stroke of the lock bar 28 between the restricting position and the non-restricting position to be reduced, enabling simple control by the control device 40 to dispose the lock bar 28 at the restricting position and the non-restricting position using the driving of the motor 36, and enabling appropriate switching between restriction and permission of changes in shift position of the lever 14 to be performed under the control of the control device 40.

Further, the motor 36 is driven in the one direction to move the lock bar 28 from the restricting position to the non-restricting position, thereby enabling the force with which the lock bar 28 is moved from the restricting position to the non-restricting position to be increased. Thus, for example, even in cases in which pivot load is being input to the lever 14 by an occupant such that contact pressure between a side face of the detent groove 20 (the rear face of the P groove 20P, the front face of the R groove 20R, or the front face of the N groove 20N) and the lower end portion of the lock bar 28 increases, thereby increasing frictional force between the side face of the detent groove 20 and the lower end portion of the lock bar 28 and creating a large resistance to movement of the lock bar 28, the lock bar 28 can still be moved from the restricting position to the non-restricting position, enabling appropriate switching between restriction and permission of changes in shift position of the lever 14.

When the motor 36 is driven in the one direction such that the lock bar 28 is moved from the restricting position to the non-restricting position, the restriction detection mechanism 48 detects that the lock bar 28 has reached the non-restricting position, and driving of the motor 36 is halted under the control of the control device 40. This enables the lock bar 28 to be suppressed from abutting the upper wall of the support frame 22A of the support plate 22, enabling contact noise that would be generated by the lock bar 28 abutting the upper wall of the support frame 22A to be suppressed.

The motor 36 is driven to move the lock bar 28 between the restricting position and the non-restricting position. There is accordingly no need to mechanically connect the button 16A on the knob 16 to the lock bar 28 through the inside of the lever 14 (including the inside of the knob 16). This enables the lever 14 (including the knob 16) to be made smaller in size and to be configured with unusual shapes (enabling the upper side portion of the lever 14 to be curved in the length direction, for example), enables, for example, an additional mechanism (such as an indicator) to be installed to the knob 16, and enables the degrees of freedom for the design of the lever 14 (including the knob 16) to be increased.

Moreover, for example, in cases in which the vehicle is to be left for a long time (while the vehicle is parked, for example), in the state in which the lever 14 is disposed at the P position (the state in which the shift detection mechanism 44 detects that the lever 14 is disposed at the P position), when a shut-down operation (such as a longer operation than that performed to move the lock bar 28 to the non-restricting position) is performed on the button 16A on the knob 16 (when the operation detection mechanism 46 has detected that the shut-down operation has been performed using the button 16A), the motor 36 is shut down (the power source is switched off) under the control of the control device 40. Thus, even if the button 16A on the knob 16 is operated while the brake 42 is in an engaged state, pivot-operation of the lever 14 from the P position toward the rear side is not permitted.

When a standby operation (such as a longer operation than that performed to move the lock bar 28 to the non-restricting position) is performed using the button 16A on the knob 16 (when the operation detection mechanism 46 has detected that the standby operation has been performed using the button 16A) while the motor 36 is in the shut-down state, the motor 36 is placed in a standby state (a state awaiting a reactivation operation) under the control of the control device 40. When the motor 36 has been placed in the standby state, the notification mechanism notifies the occupant that the motor 36 has been placed in the standby state (notifies that a button 16A reactivation operation is required, for example) under the control of the control device 40. For example, a display mechanism (such as a vehicle indicator or meter) serving as the notification mechanism displays that the motor 36 has been placed in the standby state, or a light emitting mechanism (such as an ambient light in the vehicle) serving as the notification mechanism emits light of a predetermined color.

When a reactivation operation (such as an intermittent operation performed plural times in a predetermined pattern) has been performed on the button 16A on the knob 16 (when the operation detection mechanism 46 has detected that the reactivation operation has been performed on the button 16A) while the motor 36 is in the standby state, the motor 36 is reactivated from the shut-down state (the power source is switched on) under the control of the control device 40. A pivot-operation of the lever 14 from the P position toward the rear side as described above is thereby permitted when the button 16A on the knob 16 is operated while the brake 42 is in an engaged state. The reactivation operation of the button 16A is input in advance to the control device 40 by the occupant.

As described above, pivot-operation of the lever 14 from the P position is not permitted when the motor 36 has been shut down. This enables theft of the vehicle to be effectively suppressed, enabling vehicle security to be improved.

Note that in the present exemplary embodiment, the detent groove 20 is provided to the lever 14, and the lock bar 28 (including the motor 36 and the like) is provided to the vehicle body side (the plate 12 and the support plate 22). However, configuration may be made in which the lock bar 28 (including the motor 36 and the like) is provided to the lever 14, and the detent groove 20 is provided to the vehicle body side (at least one of the plate 12 or the support plate 22).

In the present exemplary embodiment, the shift lever device 10 is floor mounted, and is installed to the floor section of the vehicle cabin. However, the shift lever device 10 may be installed to a column cover or an instrument panel in the vehicle cabin.

The disclosure of Japanese Patent Application No. 2016-178006, filed on Sep. 12, 2016, is incorporated in its entirety by reference herein.

EXPLANATION OF THE REFERENCE NUMERALS 10 shift lever device (shift device)
14 lever (shift body)
28 lock bar (restriction section)
30 cam (rotation section)
36 motor

The invention claimed is:

1. A shift device comprising:
   a shift body that is provided with a grip section and that is pivoted around an axis of a support shaft to change a shift position;
   a restriction section that is disposed in a restricting position to restrict changing of the shift position of the shift body, and that is moved from the restricting position to a non-restricting position to permit changing of the shift position of the shift body;
   an operation section that is configured to be operated; and
   a rotation section having a rotation position that is changed by operation of the operation section so that the restriction section is moved from the restricting position to the non-restricting position, the restriction section being moved as the rotation position is changed,
   wherein the grip section and the rotation section are disposed at opposite sides radially relative to the axis of the support shaft,
   wherein the shift body has a longitudinal axis, and
   wherein the rotation section and the restriction section are disposed at an opposite side of the support shaft from the grip section along the longitudinal axis,
   wherein a stopper section is provided at the shift body such that pivoting of the stopper section is stopped by the restriction section disposed in the restricting position, and
   wherein the grip section and the stopper section are disposed at opposite sides radially relative to the axis of the support shaft, and the rotation section is disposed between the support shaft and the stopper section.

2. The shift device of claim 1, wherein a dimension of the rotation section in a radial direction of a rotational direction of the rotation section changes.

3. The shift device of claim 1, wherein the axis of the support shaft of the shift body is disposed between the rotation section and the grip section.

\* \* \* \* \*